(12) United States Patent
Reising

(10) Patent No.: US 12,738,819 B2
(45) Date of Patent: Sep. 15, 2026

(54) METHOD FOR PRODUCING A WAVE WINDING COIL WINDING

(71) Applicant: Schaeffler Technologies AG & Co. KG, Herzogenaurach (DE)

(72) Inventor: Sebastian Reising, Alzenau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 690 days.

(21) Appl. No.: 18/016,168

(22) PCT Filed: Jul. 1, 2021

(86) PCT No.: PCT/DE2021/100557

§ 371 (c)(1),
(2) Date: Jan. 13, 2023

(87) PCT Pub. No.: WO2022/012714

PCT Pub. Date: Jan. 20, 2022

(65) Prior Publication Data

US 2023/0275495 A1 Aug. 31, 2023

(30) Foreign Application Priority Data

Jul. 17, 2020 (DE) ..................... 10 2020 118 925.7

(51) Int. Cl.
*H02K 15/043* (2025.01)
*H01F 41/071* (2016.01)
*H02K 3/14* (2006.01)

(52) U.S. Cl.
CPC ....... *H02K 15/0433* (2025.01); *H01F 41/071* (2016.01); *H02K 3/14* (2013.01)

(58) Field of Classification Search
CPC ..... H02K 15/0433; H02K 3/14; H01F 41/071
See application file for complete search history.

(56) References Cited

U.S. PATENT DOCUMENTS 10,749,418 B2 * 8/2020 Ponzio .............. H02K 15/0433
11,581,789 B2 * 2/2023 Haggenmüller ... H02K 15/0433
(Continued)

FOREIGN PATENT DOCUMENTS

DE 10359863 A1 7/2004
DE 102004035084 A1 2/2006
(Continued)

*Primary Examiner* — Thomas J Hong
*Assistant Examiner* — Jose K Abraham
(74) *Attorney, Agent, or Firm* — Volpe Koenig

(57) ABSTRACT

A method for producing a wave winding for forming a coil winding with at least one wave winding layer in a stator or rotor element, wherein a winding former is provided with at least two winding sections and such that it can be rotated about a longitudinal axis. The method includes the following method steps: applying parallel coil wires to a first side of the winding former in a winding section of the winding former; forming winding heads by alternately axially shifting the parallel coil wires on the winding former and winding same about the rotated winding former; repeating these steps until the wave winding has reached a length of a first wave winding layer of the coil winding, wherein the steps are repeated in another winding section with a different winding width by increasing or decreasing the width in a step-wise manner along the longitudinal axis. A winding former is provided for producing a wave winding of this type which is suitable for introduction into grooves of a stator or rotor element.

8 Claims, 2 Drawing Sheets

(56) References Cited

U.S. PATENT DOCUMENTS

| | | | | |
|---|---|---|---|---|
| 2001/0020807 | A1* | 9/2001 | Imori | H02K 3/50 310/179 |
| 2005/0116572 | A1 | 6/2005 | Fukasaku et al. | |
| 2009/0001841 | A1* | 1/2009 | Naganawa | H02K 15/0433 29/735 |
| 2009/0261683 | A1* | 10/2009 | Sadiku | H02K 3/12 310/207 |
| 2016/0230814 | A1* | 8/2016 | Schumann | F16D 13/50 |
| 2018/0166955 | A1* | 6/2018 | Kajita | H01F 41/071 |
| 2018/0166957 | A1* | 6/2018 | Kajita | H02K 15/065 |
| 2018/0331606 | A1* | 11/2018 | Sadiku | H02K 15/0433 |
| 2021/0305886 | A1* | 9/2021 | Ide | H02K 3/12 |

FOREIGN PATENT DOCUMENTS

| | | | | |
|---|---|---|---|---|
| DE | 602005001769 | T2 | | 4/2008 |
| DE | 102015120661 | A1 | | 6/2017 |
| JP | 2013128364 | A | * | 6/2013 |
| KR | 20180003580 | A | | 1/2018 |
| KR | 101967607 | B1 | | 8/2019 |
| WO | 2017153502 | A1 | | 9/2017 |

* cited by examiner

METHOD FOR PRODUCING A WAVE WINDING COIL WINDING

CROSS-REFERENCE TO RELATED APPLICATIONS

This application is the U.S. National Phase of PCT Appln. No. PCT/DE2021/100557 filed Jul. 1, 2021, which claims priority to DE 102020118925.7 filed Jul. 17, 2020, the entire disclosures of which are incorporated by reference herein.

TECHNICAL FIELD

The disclosure relates to a method for producing a coil winding and a winding former that is suitable for use in the method.

BACKGROUND

Different methods for producing coil windings are known from the prior art. One way to produce coil windings is to produce a flat wave winding by helically winding a conductor wire around an elongated, flat winding former. This wave winding is then inserted into grooves of a stator or rotor element and forms a coil winding there, which runs around the circumference of the stator or rotor element at least once.

For this purpose, a winding device for generating wave windings by helically winding conductor wire is used. When winding around a winding former with a rectangular and flat cross section, a conductor wire or an entire bundle of conductor wires is shifted several times in the area of the transition from one side of the winding former to the other side of the winding former, so that winding heads are created and the respective wires on the sides of the winding former form wire webs. In this way a flat wave winding is produced. The wave winding created in this way is either drawn directly into the grooves of rotors or stators, or transferred to a transfer tool that corresponds geometrically to the stator or rotor element. The drawn-in wave winding forms the coil winding of the stator or rotor. Such a method is known, for example, from DE 10 2015 120 661 A1.

When such a wave winding is formed by winding lead wires around a winding former and intermittently shifting the conductor wires as described above, a flat winding mat with an arbitrary length can be obtained. In this process, individual wire webs of conductor wires, which are each arranged between two winding heads, can also form more than one layer and change their position in relation to one another in the course of the wave winding. As described above, such a wave winding can also be drawn into the stator or rotor element in multiple layers as a coil winding and, due to the continuity of the winding, requires little electrical connection of individual partial windings or conductor groups to be subsequently attached.

The disadvantage of such a multi-layer insertion of a wave winding is that the radius of the coil winding changes with each wave winding layer of the wave winding inserted into the stator or rotor grooves. As a result, the winding heads of the wave winding require more space when viewed axially as the insertion radius decreases. The wave winding consequently forms a frustoconical geometry at the axial ends of the rotor or stator. Such a geometry is disadvantageous with regard to the power density of electric motors, since due to these frustoconical areas of the winding, an axial space available for the stator or rotor in the electric motor cannot be used.

SUMMARY

The object of the disclosure is therefore to overcome the disadvantages of the prior art and to produce a method for producing a coil winding and a winding former with which the available space can be used efficiently by means of geometrically optimized coil or wave windings for stators or rotors.

Main features of the disclosure are described herein and claimed in the claims. The disclosure further relates to a winding former according to embodiments described herein and claimed in the claims.

The disclosure relates to a method for producing a wave winding for forming a coil winding with at least one wave winding layer in a stator or rotor element, wherein a winding former can be rotated about a longitudinal axis and has at least one winding section with a winding width is provided, having the method steps:

feeding parallel coil wires onto a first side of the winding former in a winding section of the winding former; forming winding heads by alternately axially shifting the parallel coil wires on the winding former and winding them around the rotated winding former; repeating the previous steps until the wave winding has reached a length of a first wave winding layer of the coil winding, wherein, according to the disclosure, the winding former is formed with at least one further winding section with a different winding width and the previous steps are repeated at least in the further winding section with a different winding width.

It is conceivable that the winding starts at an end of the winding former with a large winding width or at an end of the winding former with a small winding width of a winding section. It is also conceivable, if there are more than two winding sections on the winding former, to start with an inner winding section.

The advantage of the method according to the disclosure is that the winding width of the wave winding can be designed in such a way to compensate for the radius for the coil winding changing with each wave winding layer. In particular, this is advantageous with regard to the geometries that can be achieved, since frustoconical geometries of the coil windings in the area of the winding heads can be avoided and cylindrical geometries can be achieved. Electric motors with such geometries have a higher power density in relation to the available axial length. As a result, a higher output is achieved with such a coil winding in a stator or rotor, or the stator or rotor can be designed smaller-in contrast to designs with frustoconical winding heads.

According to a specific embodiment of the method, an axial shift of the winding former along its longitudinal axis is provided for transferring the coil wires to be wound into the other winding section. This axial shift can take place when the wave winding wound in the active winding section has reached a length which corresponds to the circumference of a wave winding layer of the coil winding inserted into the stator or rotor. As a result, the wave winding can be produced on the same winding former without removing or abandoning areas that have already been wound and without converting the winding former to a different winding width, and can be produced efficiently in one pass.

According to a further embodiment of the method, an intermediate step with an intermediate winding in an intermediate section is provided during the transfer from one winding section to the next winding section, wherein a winding width of the intermediate section is between the winding widths of the winding sections. In the method according to the disclosure, the transfer from one winding section to the next winding section takes place when the wave winding has reached a length of one wave winding layer of the coil winding. In particular, the provision of an intermediate step in which an intermediate winding is created can be advantageous, since during a transfer of the wave winding to a stator or rotor, the transition from a wave winding layer with a first circumference to a layer with a different circumference in the transition area may require different wire lengths or a different winding geometry. The intermediate winding can take place in an intermediate section of the winding former. Furthermore, the winding in the intermediate section can be done with a winding width that differs from the winding width of the previously used and subsequently used winding section. By providing a method step with which such an intermediate winding can be produced, the advantages described above in relation to the elimination of set-up times and in relation to the increase in efficiency of the method are again achieved.

According to one variant of the method, the method steps are repeated until a desired number of wave winding layers is reached for drawing into the stator or rotor element. The coil winding produced in this way is made up of continuous conductor wires. A wave winding layer, in relation to the coil winding, is a length of wave winding which, when inserted, forms a circumferential layer of conductor wires in the stator or rotor element. The coil winding can thus advantageously be produced in a single pass using the method and can be used in one piece either directly in a stator or rotor element or can be transferred into the stator or rotor element using a transfer tool.

In a further embodiment of the method, it can prove advantageous if the windings to produce the respective wave winding layers are repeated in winding sections with increasing winding widths. In this way, the entire wave winding can be easily stripped off the winding sections that increase in stages, counter to the production direction. This simplifies the process sequence, since there is no need to expose the winding former with a view to stripping off the wave winding wound around the former.

Furthermore, a method step can be provided, according to which the wave winding is fed into a transfer tool for inserting the wave winding into grooves of a stator element or rotor element. The wave winding can be inserted in its entirety into the transfer tool, and then transferred whole into the stator or rotor grooves. Alternatively, there is also the possibility that the wave winding is continuously fed into the transfer tool and is continuously transferred by the transfer tool into the stator or rotor grooves of the stator or rotor element. Alternatively, the wave winding can be drawn directly into the stator or rotor when it is drawn into a rotor or stator with grooves open radially outwards.

A coil winding can thus be produced for a circumference that increases or decreases with each wave winding layer, which has a constant axial extent when installed in the stator or rotor element. Complex assembly from individual partial windings with different winding widths can be omitted. In this way, on the one hand, the reliability of the coil winding is increased, while its space requirement is optimized. In addition, a coil winding produced according to such a method can be produced in a shorter time due to the continuity of the conductor wires and can also be inserted in a stator or rotor element in a shorter time.

In a particular embodiment of the method, the wave winding is completely stripped off the winding former and the wave winding is transferred to a transport device. By means of the provision of a transport device, the method can be further optimized in terms of space requirements, since the wave winding produced does not have to be drawn in on site or transferred to a transfer tool, but can be fed to another machine in a transport device or can be temporarily stored in the transport device.

The disclosure also relates to a winding former for producing a wave winding from parallel coil wires that is suitable for drawing into grooves in a stator or rotor element, wherein the winding former is rotatable and has an essentially rectangular cross section. For the winding former, it is provided according to the disclosure that the winding former has at least two winding sections with different winding widths axially, i.e., along its longitudinal axis. The winding sections with different winding widths allow a continuous wave winding to be produced from a number of parallel wires, which has a varying width along its course. The winding former can preferably be rotated in 180-degree increments. Furthermore, an advantageous embodiment of the winding former is one in which the winding former has a sword-like shape, i.e., has a large length-to-width ratio based on its overall length and width and the thickness of the winding former is selected to be as small as possible. The winding width of the winding sections can be predetermined in such a way that the change in the winding width compensates for the difference in circumference for each wave winding layer of the inserted coil winding.

According to a further embodiment of the disclosure, it is provided that the winding width is constant along the longitudinal axis within the respective winding sections. In this way, an axial extension with respect to the stator element or rotor element is prevented from changing within a wave winding layer of a coil winding inserted into a stator or rotor. Thus, a winding head that remains the same in the axial extension in relation to the stator or rotor element is produced for each wave winding layer in the stator or rotor.

According to a further embodiment of the disclosure, it is provided that the winding width of the winding sections increases in steps along the longitudinal axis. In this way, areas of a wave winding that have an increasing winding width can be generated sequentially in a particularly time-saving manner, since the winding former can be wound continuously. The winding can be started at an end with a large winding width or an end with a small winding width of the winding section. It is also conceivable, if there are more than two winding sections on the winding former, to start with an inner winding section.

According to a further embodiment of the disclosure, it is provided that the winding width of the winding sections increases alternately from a free end of the winding former along the longitudinal axis. In this way, a coil winding can be produced which, when drawn into a stator or rotor element, has a homogeneous distribution of the winding heads, making allowance for the circumferential variation with each wave winding layer.

Furthermore, in one embodiment of the disclosure it can be provided that the winding areas have different lengths along the longitudinal axis of the winding former. The length of the respective winding sections can preferably be provided as a function of the wave winding layers to be produced. In this way, the space requirement of the winding former is optimized along the longitudinal axis. Provision can also be made for an intermediate section to be arranged between two winding sections, which can have a winding width that differs from the winding sections. The intermediate sections allow intermediate windings to be produced which allow a transition from one wave winding layer of the coil winding to another wave winding layer situated radially further inwards or outwards in the stator or rotor element.

BRIEF DESCRIPTION OF THE DRAWINGS

Further features, details and advantages of the disclosure are provided in the following description of exemplary embodiments with reference to the drawings. In the figures.

DETAILED DESCRIPTION

Figure 1A:
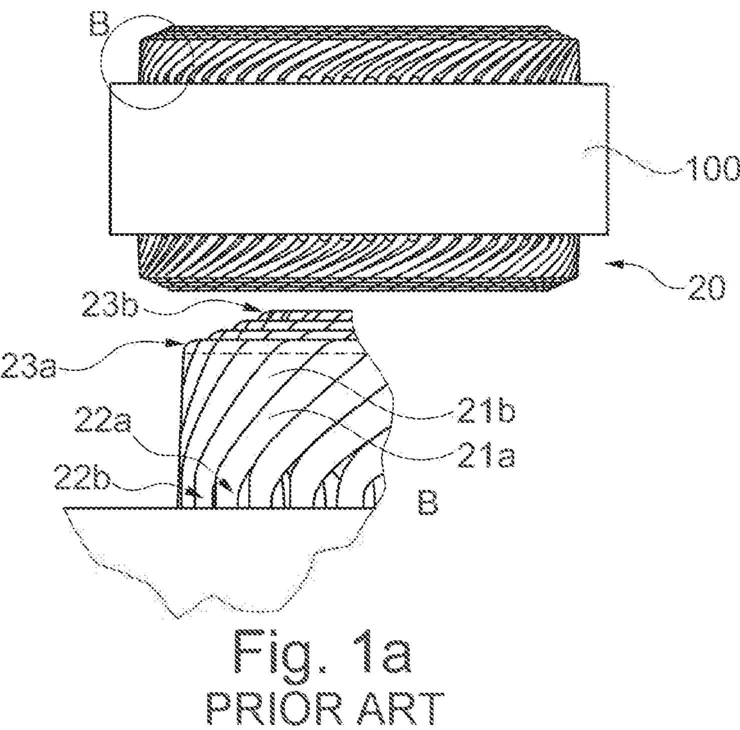
FIG. 1*a* shows a schematic view of a coil winding drawn into a stator or rotor element which has been produced according to the prior art or has been produced with a winding former according to the prior art.

FIG. 1*a* shows a schematic view of a coil winding 20 drawn into a stator or rotor element 100 which has been produced according to the prior art or has been produced using a winding former according to the prior art.

In the detailed view it can be seen that the winding heads 21*a, b* have a greater axial extent with each wave winding layer 23*a,b* lying radially further inwards. The coil winding 20 used piles up in such a way that the winding heads in the stator or rotor element 100 form a frustoconical structure. This results in an increased space requirement, wherein the axial distance between the radially outer wave winding layer 23*a* in this exemplary embodiment of the prior art and the radially inner wave winding layer 23*b* is unused.

Figure 1B:
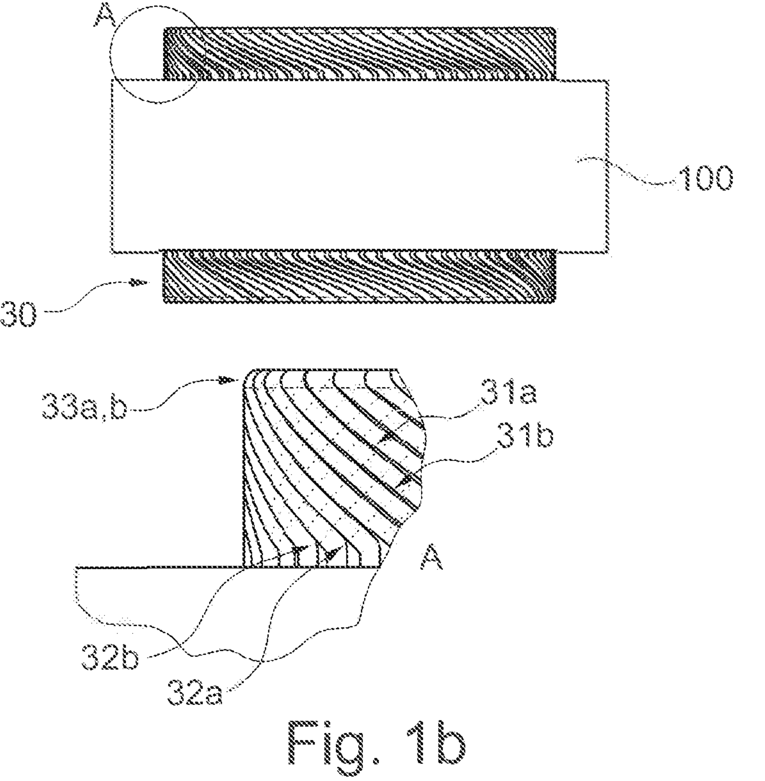
FIG. 1*b* shows a schematic view of a coil winding drawn into a stator or rotor element which has been produced by the method according to the disclosure or has been produced with a winding former according to the disclosure.

FIG. 1*b* shows a schematic view of a coil winding 30 drawn into a stator or rotor element which has been produced from a wave winding by the method according to the disclosure or has been produced with a winding former 10 according to the disclosure. It can be seen here that the winding heads 31*a, b*, unlike FIG. 1*a*, which describes the prior art, all lie in one plane when viewed axially. Consequently, the wave winding layers 33*a,b* of the coil winding 30 are also completely overlapping. As a result, the space available for the coil winding 30 of the stator or rotor is optimally used.

Figure 2:
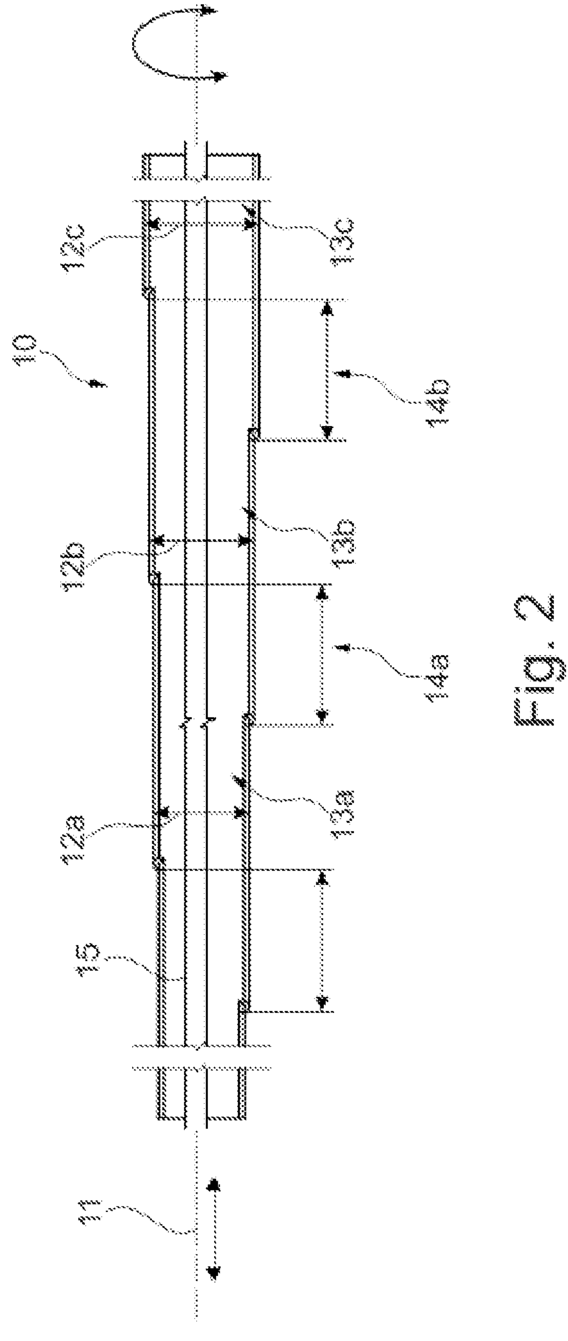
FIG. 2 shows a schematic representation of a winding former according to the disclosure.

FIG. 2 shows a schematic representation of a winding former 10 according to the disclosure in a plan view of the first side 15 of the winding former 10. The winding former 10 is elongated and has a flat cross section. The winding former 10 thus has a sword-like shape, wherein the winding former 10 has a large length-to-width ratio in relation to its overall length and its overall width. The thickness of the winding former 10 is chosen to be as small as possible.

The winding former 10 can be rotated about a longitudinal axis 11 by at least 180° in both directions. The winding former 10 can be shifted axially along the longitudinal axis 11.

The winding former 10 has several winding sections 13*a,b,c*, each of which has a constant winding width 12*a,b,c*. The winding widths 12*a,b,c* of the winding sections 13*a,b,c* increase steadily from left to right in the illustration in FIG. 2. However, it is equally possible to provide a winding former 10 in which, viewed from left to right, a winding width 12*a,b,c* is provided that decreases in each case for the winding sections 13*a,b,c*. The left-hand end of the winding former 10 can represent an open end, while a right-hand end with a stop and a swivel joint can have a closed end.

Intermediate sections 14*a,b* are provided between the winding sections 13*a,b,c* and can be wound when the length of the coil winding 30 produced has reached the circumference of a specific wave winding layer 33*a,b* of the coil winding 30 to be drawn into a stator element or rotor element 100. For the transition between the wave winding layers 33*a,b*, the coil winding 30 can take place in the respective intermediate section 14*a,b*.

The increase in the winding width 12*a,b,c* of the winding sections 13*a,b,c* takes place in stages along the longitudinal axis. The winding can be started in the winding section 13*a* with a small winding width 12*a* at the open end of the winding former 10. Alternatively, it is also possible to start at the closed end of the winding former 10 in a winding section 13*c* with a large winding width 12*c*. It is also conceivable that if there are more than two winding sections 13*a,b,c* on the winding former 10, the winding starts at an inner winding section 13*b*.

It can be seen in FIG. 2 that the increase in the winding width 12*a,b,c* of the winding sections 13*a,b,c* takes place from a free end of the winding former 10 alternately at a changing distance. The winding sections 13*a,b,c* can have different lengths along the longitudinal axis 11 of the winding former 10.

An intermediate section 14*a,b* is arranged between two winding sections 13*a,b* or 13*b,c*, which can have a winding width that differs from the winding sections 13*a,b* or 13*b,c*. The intermediate sections 14*a,b* can be used to produce intermediate windings which allow a transition from one wave winding layer 33*a* of the coil winding 30 to another wave winding layer 33*b* lying radially further inwards or outwards in the stator or rotor element.

LIST OF REFERENCE NUMERALS

10 Winding former
11 Longitudinal axis
12*a,b,c* Winding width
13*a,b,c* Winding section
14*a,b* Intermediate section
15 First side
20 Coil winding (prior art)
21*a,b* Winding head (prior art)
22*a,b* Wire web (prior art)
23*a,b* Wave winding layer (prior art)
30 Coil winding
31*a,b* Winding head
32*a,b* Wire web
33*a,b* Wave winding layer
100 Stator or rotor element

The invention claimed is:

1. A method for producing a wave winding for forming a coil winding having at least one wave winding layer in a stator or rotor element with a winding former rotatable about a longitudinal axis, comprising the method steps:

a. feeding parallel coil wires onto a first side of the winding former in a winding section of the winding former, the winding section having a first winding width;

b. forming winding heads by alternately axially shifting the parallel coil wires on the winding former and winding them around the winding former that is rotated; and c. repeating steps a and b until the wave winding has reached a length of a first wave winding layer of the coil winding, repeating steps a and b in at least one further winding section of the winding former with a different winding width than the first winding width until the wave winding has reached a length of a further wave winding layer of the coil winding; and wherein an intermediate step having an intermediate winding in an intermediate section is provided in a transfer from the winding section to the further winding section, wherein a winding width of the intermediate section lies between the winding widths of the winding sections and is uniform in the intermediate section between the winding section and further winding section, whereby forming of a frustoconical winding is avoided by increasing or decreasing the winding widths in a step-wise manner along the longitudinal axis.

2. The method according to claim 1, further comprising the method step:

shifting the winding former in an axial direction along the longitudinal axis for transferring the coil wires to be wound into the further winding section.

3. The method according to claim 1, further comprising the method step:

repeating steps a to c until a desired number of wave winding layers is reached for insertion into the stator or rotor element.

4. The method according to claim 1, wherein steps a to c are repeated in winding sections with increasing winding widths.

5. The method according to claim 1, further comprising the method step:

feeding the wave winding into a transfer tool for insertion of the wave winding into grooves of the stator or rotor element.

6. The method according to claim 1, further comprising the method step:

removing completely the coil winding from the winding former and transferring the coil winding to a transport device.

7. The method according to claim 1, wherein the step-wise winding width increase is the only width transition between the winding section and the at least one further winding section.

8. The method according to claim 1, wherein the step-wise winding width increase is located at each axial end of the intermediate section.

* * * * *